United States Patent
Zhang et al.

(10) Patent No.: US 10,360,430 B2
(45) Date of Patent: *Jul. 23, 2019

(54) IMAGE ACQUISITION APPARATUS, TERMINAL DEVICE, LIQUID CRYSTAL TERMINAL DEVICE AND IMAGE ACQUISITION METHOD

(71) Applicant: Vkansee Technology Company Ltd., Shenzhen, Guangdong (CN)

(72) Inventors: Mingfang Zhang, Guangdong (CN); Shuguang Wang, Guangdong (CN); Jianfeng Yang, Guangdong (CN)

(73) Assignee: Vkansee Technology Company Ltd., Shenzhen, Guangdong (CN)

( * ) Notice: Subject to any disclaimer, the term of this patent is extended or adjusted under 35 U.S.C. 154(b) by 280 days.

This patent is subject to a terminal disclaimer.

(21) Appl. No.: 15/328,874

(22) PCT Filed: Dec. 19, 2014

(86) PCT No.: PCT/CN2014/094342
§ 371 (c)(1),
(2) Date: Jan. 24, 2017

(87) PCT Pub. No.: WO2015/149545
PCT Pub. Date: Oct. 8, 2015

(65) Prior Publication Data
US 2017/0249494 A1    Aug. 31, 2017

(30) Foreign Application Priority Data

Apr. 4, 2014 (CN) .................... 2014 2 0165231 U
Jun. 20, 2014 (CN) ......................... 2014 1 0281377

(51) Int. Cl.
*G06K 9/00* (2006.01)
*G02F 1/133* (2006.01)
(Continued)

(52) U.S. Cl.
CPC ....... *G06K 9/00026* (2013.01); *G02F 1/1336* (2013.01); *G02F 1/13306* (2013.01);
(Continued)

(58) Field of Classification Search
CPC ........... G06K 9/00026; G06K 9/00013; G06K 9/00033; G02F 1/1336; G02F 1/133553;
(Continued)

(56) References Cited

U.S. PATENT DOCUMENTS 6,185,319 B1 *  2/2001  Fujiwara ............ G06K 9/00013
                                                              356/71
6,330,346 B1   12/2001  Peterson et al.
(Continued)

FOREIGN PATENT DOCUMENTS

CN        1674038 A      9/2005
CN      101097914 A      1/2008
(Continued)

OTHER PUBLICATIONS

Extended European Search Report dated Nov. 20, 2017, for EP application No. 14888165.9, 10 pages.

*Primary Examiner* — Phuoc Tran
(74) *Attorney, Agent, or Firm* — Rudy J. Ng; Bret E. Field; Bozicevic, Field & Francis LLP

(57) ABSTRACT

An image acquisition apparatus, a terminal device, a liquid crystal terminal device and an image acquisition method are provided according to the disclosure. The image acquisition apparatus includes an imaging plate and an image sensor disposed to be spaced apart from one side of the imaging plate. The imaging plate is provided with an imaging pinhole corresponding to the image sensor. The liquid crystal terminal device includes an LCD panel and a backlight element. The image acquisition apparatus is disposed at a position corresponding to the LCD panel within the back-
(Continued)

light element. The image acquisition method includes acquiring an image of an object to being scanned by the image sensor through the imaging pinhole at a side of the imaging panel. An ultrathin fingerprint scanner can be formed based on pinhole imaging principle in the disclosure, and can be further combined with an LCD screen to accomplish fingerprint acquisition function. Alternatively, an ultrathin image acquisition device can be formed to acquire an image of a general object. This can significantly reduce the size and thickness of an image acquisition module in the device and greatly facilitate the implementation of mobile devices and embedded devices with an image acquisition function.

8 Claims, 10 Drawing Sheets

(51) Int. Cl.
*G02F 1/1333* (2006.01)
*G02F 1/1335* (2006.01)
*G02F 1/13357* (2006.01)

(52) U.S. Cl.
CPC .... *G02F 1/13338* (2013.01); *G02F 1/133553* (2013.01); *G06K 9/00013* (2013.01); *G06K 9/00033* (2013.01); *G02F 2203/02* (2013.01)

(58) Field of Classification Search
CPC ............. G02F 1/13338; G02F 1/13306; G02F 2203/02
See application file for complete search history.

(56) References Cited

U.S. PATENT DOCUMENTS

| | | | |
|---|---|---|---|
| 9,864,893 B2* | 1/2018 | Kim | .................... G06K 9/0004 |
| 2003/0174870 A1 | 9/2003 | Kim et al. | |
| 2008/0122803 A1 | 5/2008 | Izadi et al. | |

FOREIGN PATENT DOCUMENTS

| | | |
|---|---|---|
| CN | 201477614 U | 5/2010 |
| CN | 102842026 A | 12/2012 |
| CN | 102902090 A | 1/2013 |
| CN | 203838722 U | 9/2014 |
| CN | CN104063704 A | 9/2014 |

* cited by examiner

IMAGE ACQUISITION APPARATUS, TERMINAL DEVICE, LIQUID CRYSTAL TERMINAL DEVICE AND IMAGE ACQUISITION METHOD

This application claims priorities to Chinese Patent Application NO. 201420165231.3, titled "Liquid crystal terminal device and fingerprint acquisition device", filed on Apr. 4, 2014, and Chinese Patent Application NO. 201410281377.9, titled "Image acquisition apparatus, liquid crystal terminal device, and fingerprint, image acquisition method", filed on Jun. 20, 2014, the entire contents of which are incorporated herein by reference.

TECHNICAL FIELD

The present disclosure relates to the field of image acquisition, and in particular, to an image acquisition apparatus, a terminal device, a liquid crystal terminal device and an image acquisition method.

BACKGROUND

Currently there are mainly two methods for acquiring a fingerprint image. One is to acquire a fingerprint directly by means of a semiconductor chip, and the other is an optical acquisition method based on an optical lens. Each of the two methods has advantages and disadvantages. A traditional fingerprint acquisition method based on the semiconductor chip has disadvantages such as insufficient anti-static and anti-corrosion abilities. Furthermore, the large size of an optical fingerprint acquisition device make it difficult to meet requirements of a mobile device for thickness, size and the like.

The existing fingerprint image scanner, such as a thin type optical fingerprint acquisition device disclosed in Chinese Patent Application NO. 201120403301.0, generally includes an image acquisition prism, an imaging apparatus and an image processing element. The imaging apparatus further includes a lens, a photoelectric signal conversion circuit, a digital processor and the like. A relatively long light path is required to meet the requirement for light imaging, because the image acquisition prism is used as an acquisition component for light, and the lens is required to complete the light imaging of fingerprint. The image scanner must have a relatively large volume and thickness to implement the acquisition of a fingerprint image, due to a relatively large volume and thickness of the image acquisition prism and the lens, as well as factors such as the length of light path. In addition, it is difficult for the existing image scanner to meet requirements of various electronic terminals for low cost, small volume and ultra-thinness of the image scanner, due to the high cost and complex structure caused by associated components such as the image acquisition prism and the lens.

SUMMARY

An object of the disclosure is to provide an image acquisition apparatus, a terminal device, a liquid crystal terminal device and an image acquisition method, so as to significantly reduce the size and thickness of an image (particularly a palm print and a fingerprint) acquisition module in the device and greatly facilitate the implementation of mobile devices and embedded devices with an image acquisition function.

In order to achieve the above object, an image acquisition apparatus is provided according to the disclosure, which includes an imaging plate and an image sensor disposed to be spaced apart from one side of the imaging plate, wherein the imaging plate is provided with an imaging pinhole corresponding to the image sensor, and light through the imaging pinhole is imaged by the image sensor.

Furthermore, the imaging plate is provided with at least two imaging pinholes. The number of image sensors is at least one. The image sensors are disposed corresponding to the imaging pinholes. Light through the imaging pinholes is imaged by the image sensors.

Furthermore, a distance from an object being scanned to a center of an axis of the imaging pinhole is an object distance $h_{object}$, and the object distance $h_{object}$ satisfies a formula of $$h_{object} \geq \frac{\sqrt{2}\, r}{2 tg(\alpha/2)},$$

wherein r represents a distance between centers of two adjacent imaging pinholes, and α represents an angular field of view of the imaging pinhole.

Furthermore, the distance r between the centers of two adjacent imaging pinholes satisfies a formula of $r \geq 2 \cdot h_{image} tg(\alpha/2)$ wherein $h_{image}$ represents an image distance, which is a distance from the image sensor to the center of the axis of the imaging pinhole, and α represents the angular field of view of the imaging pinhole.

Furthermore, the image acquisition apparatus further includes a protection panel disposed to be spaced apart from the other side of the imaging plate.

Furthermore, the image acquisition apparatus further includes a light source for providing the imaging pinhole with illumination for imaging.

Furthermore, the image acquisition apparatus further includes a wired and/or wireless communication module connected to the image sensor.

Furthermore, an aperture of the imaging pinhole is in a range from 0.001 mm to 1 mm.

A terminal device is provided, which includes the image acquisition apparatus.

A liquid crystal terminal device is provided, which includes a liquid crystal display (LCD) screen. The LCD screen includes an LCD panel and a backlight element. The backlight element includes a reflective sheet, a back plate and at least one layer of optical film disposed between the LCD panel and the reflective sheet. The image acquisition apparatus is disposed between the reflective sheet and the back plate at a position corresponding to the LCD panel. A via is disposed on the reflective sheet at a position corresponding to the image acquisition apparatus. A light transmitting window is disposed on the optical film at a position corresponding to the image acquisition apparatus.

A liquid crystal terminal device is provided, which includes a liquid crystal display (LCD) screen. The LCD screen includes an LCD panel and a backlight element. The backlight element includes a reflective sheet, a back plate and at least one layer of optical film disposed between the LCD panel and the reflective sheet. The image acquisition apparatus is disposed at the other side of the back plate at a position corresponding to the LCD panel. A first via and a second via interlinked are respectively disposed on the reflective sheet and the back plate at positions corresponding to the image acquisition apparatus. A light transmitting window is disposed on the optical film at a position corresponding to the image acquisition apparatus.

A liquid crystal terminal device is provided, which includes a liquid crystal display (LCD) screen. The LCD screen includes an LCD panel and a backlight element. The backlight element includes a reflective sheet, a back plate and at least one layer of optical film disposed between the LCD panel and the reflective sheet. An image sensor is disposed between the reflective sheet and the back plate at a position corresponding to the LCD panel. An imaging pinhole is disposed on the reflective sheet at a position corresponding to the image sensor. The imaging pinhole is disposed to be spaced apart from the image sensor. A light transmitting window is disposed on the optical film at a position corresponding to the image sensor.

A liquid crystal terminal device is provided, which includes a liquid crystal display (LCD) screen. The LCD screen includes an LCD panel and a backlight element. The backlight element includes a reflective sheet, a back plate and at least one layer of optical film disposed between the LCD panel and the reflective sheet. An image sensor is disposed at the other side of the back plate at a position corresponding to the LCD panel. An imaging pinhole is disposed through the reflective sheet and the back plate at a position corresponding to the image sensor. The imaging pinhole is disposed to be spaced apart from the image sensor. A light transmitting window is disposed on the optical film at a position corresponding to the image sensor.

Furthermore, an aperture of the imaging pinhole is in the range from 0.001 mm to 1 mm.

Furthermore, an optical filter is disposed between the imaging pinhole and the image sensor or between the imaging pinhole and the LCD panel.

Furthermore, a correction lens is disposed on either side or both sides of the imaging pinhole.

An image acquisition method for the image acquisition apparatus is provided, which includes the following steps:

establishing a plurality of scanning regions for one object being scanned, wherein adjacent scanning regions are overlapping with each other;

capturing partial images of the object being scanned in the scanning regions by the image sensor through the imaging pinholes, wherein partial images in adjacent imaging regions do not overlap with each other; and stitching together the partial images in each of imaging regions obtained through scanning to obtain a complete image of the object being scanned.

An image acquisition method for the liquid crystal terminal device is provided, which includes the following steps:

putting an LCD panel into a transparent state in response to a control signal; and acquiring an image of an object being scanned on one side of the LCD panel by the image sensors through the imaging pinholes at the other side of the LCD panel.

Furthermore, the acquiring an image of an object being scanned on one side of the LCD panel by the image sensors through the imaging pinholes at the other side of the LCD panel includes:

establishing a plurality of scanning regions for one object being scanned, wherein adjacent scanning regions are overlapping with each other;

capturing partial images of the object being scanned in the scanning regions one by one, wherein partial images in adjacent imaging regions do not overlap with each other; and stitching together the partial images in each of imaging regions obtained through scanning to obtain a complete image of the object being scanned.

Furthermore, the acquiring an image of an object being scanned on one side of the LCD panel by the image sensors through the imaging pinholes at the other side of the LCD panel includes:

establishing a plurality of scanning regions for one object being scanned, wherein adjacent scanning regions are overlapping with each other;

putting an LCD panel into a transparent state, one by one corresponding to respective scanning regions, in response to a control signal;

capturing partial images of the object being scanned in the scanning regions one by one, wherein partial images in adjacent imaging regions do not overlap with each other; and stitching together the partial images in each of imaging regions obtained through scanning to obtain a complete image of the object being scanned.

With the above-described solutions, the disclosure has the following advantages.

1. In the disclosure, the object being scanned is scanned using multiple pinholes. Compared with the traditional optical fingerprint scanner using an optical lens, the thickness of the image acquisition apparatus is greatly reduced, thereby facilitating the integration of the image acquisition apparatus into a mobile terminal device having a stringent demand on thickness. When acquiring of fingerprint images, an effective portion of a whole fingerprint can be acquired at once, or one by one at more times, further facilitating a clear acquisition of the image of the object being scanned.

2. In the disclosure, the structure of a liquid crystal display screen of the liquid crystal terminal device can be improved according to the imaging method with multiple pinholes, so that the liquid crystal display screen is capable of acquiring a fingerprint, supporting screen unlocking, authentication and other operations, providing a great convenience for appearance and software interface designs of an electronic device such as a mobile phone, a tablet and a wearable device, and meeting a delicate demand of the electronic device in thickness and size. In addition, the fingerprint and image acquisition method can be applied to a fingerprint recognition device needed in any field.

3. The invention can be applied to any liquid crystal display terminals, so as to provide a new fingerprint acquisition and recognition function. Here, the liquid crystal display terminal includes a tablet, a notebook, a mobile phone, an advertising LCD panel, an MP3 player and other products. The device can be connected to a wired and/or wireless communication module to form a visual monitoring network, which is widely applied to visual monitoring in an industrial production line, monitoring and detection in a complex device, three-dimensional measurement and other fields, such as forest theft and fire protection. The device can be arranged in a place which is difficult to be monitored by people, for monitoring unexpected situation, disaster and so on in real time, such as a forest, an inside of mine, an inside of underground pipeline and an inside of large remote equipment (such as lunar rover and spacecraft).

4. In this disclosure, the imaging method with multiple pinholes instead of a complex optical lens is used to acquire an image, so that the thickness of the image acquisition apparatus becomes smaller, for example, the thickness of the image acquisition apparatus may be reduced below a few millimeters, thus meeting the requirement of ultra-thinness and small volume.

DESCRIPTION OF THE EMBODIMENTS

In the following, the disclosure is described in detail in conjunction with the drawings of the specification.

Figure 1:
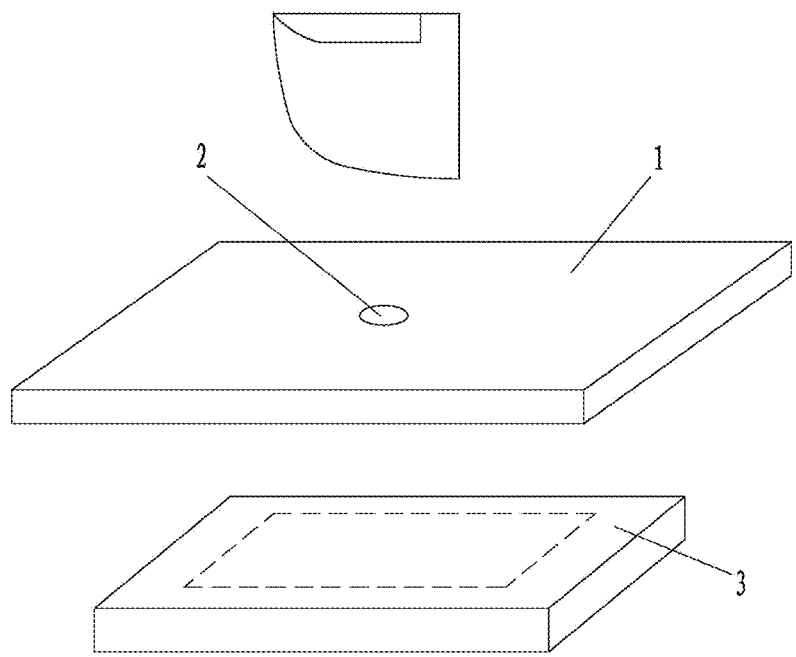
FIG. 1 is a schematic diagram of an image acquisition apparatus according to a first embodiment of the present disclosure.

FIG. 1 shows a schematic diagram of an image acquisition apparatus according to a first embodiment of the present disclosure. The image acquisition apparatus includes an imaging plate 1 and an image sensor 3.

An imaging pinhole 2 is disposed at the center of the imaging plate 1. In this embodiment, the number of the imaging pinhole 2 is set to one. Furthermore, multiple imaging pinholes 2 may be disposed.

The image sensor 3 is disposed to be spaced apart from one side of the imaging plate 1. In this embodiment, the image sensor 3 is disposed below the imaging plate 1. The image sensor 3 includes a photoelectric conversion element and an image processing element. The image sensor 3 corresponds to the imaging pinhole 2 in a vertical direction. Light through the imaging pinhole 2 is imaged by the image sensor 3.

In use, an object being scanned is disposed above the imaging plate 1 at a position corresponding to the imaging pinhole 2. In this embodiment, the object being scanned is a fingerprint. Furthermore, the object may be a face and the like. The fingerprint is imaged by the image sensor 3 through the imaging pinhole 2 by means of pinhole imaging principle, thereby acquiring the fingerprint corresponding to the imaging pinhole 2. The photoelectric conversion element of the image sensor 3 may employ CMOS or CCD technology for acquiring the fingerprint.

Figure 2:
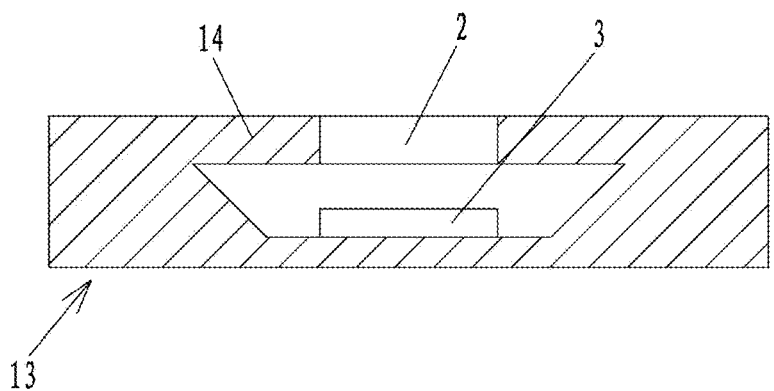
FIG. 2 is a schematic diagram of an image acquisition apparatus according to a second embodiment of the present disclosure.

FIG. 2 shows a schematic diagram of an image acquisition apparatus according to a second embodiment of the present disclosure, which is a variation of the above embodiment shown in FIG. 1. The image acquisition apparatus includes a housing 13. The imaging pinhole 2 is disposed on an upper panel 14 of the housing 13. The image sensor 3 is disposed at the bottom of an inner chamber of the housing 13 and spaced apart from the upper panel 14. The image sensor 3 corresponds to the imaging pinhole 2 in the vertical direction.

Figure 3:
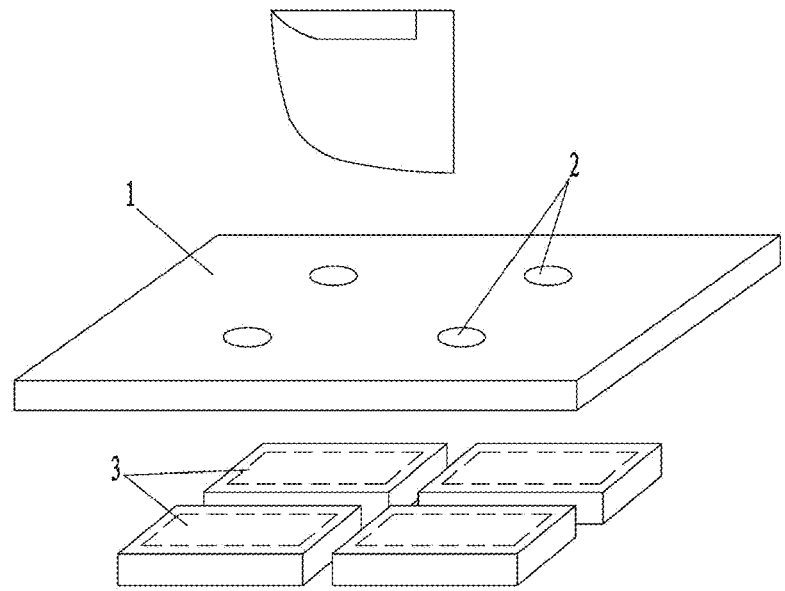
FIG. 3 is a schematic diagram of an image acquisition apparatus according to a third embodiment of the present disclosure.

FIG. 3 shows a schematic diagram of an image acquisition apparatus according to a third embodiment of the present disclosure. The image acquisition apparatus includes an imaging plate 1 and at least one image sensor 3.

At least two imaging pinholes 2 are disposed on the imaging plate 1. In this embodiment, the number of the imaging pinholes 2 is set to four.

The at least one image sensor 3 is disposed to be spaced apart from one side of the imaging plate 1. The image sensors 3 corresponds to the four imaging pinholes 2 in the vertical direction.

In the embodiment, the number of the image sensors 3 is set to four. Each image sensor 3 corresponds to one imaging pinhole 2, respectively. Light through the imaging pinholes 2 is imaged by the image sensors 3.

Figure 4:
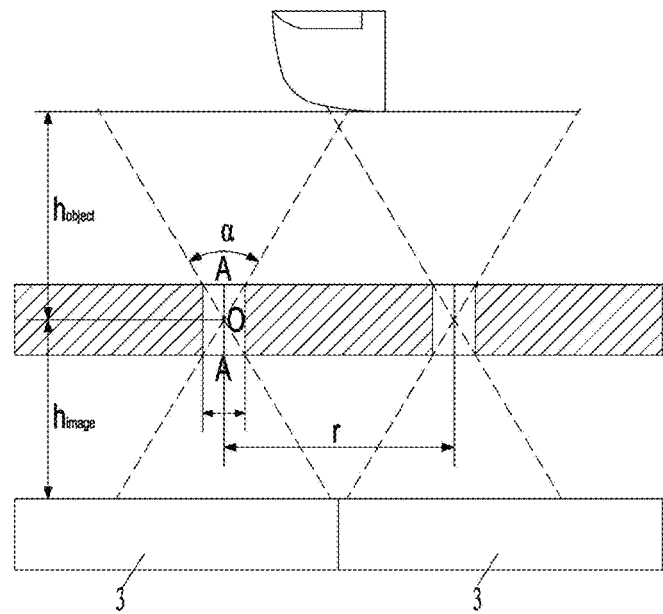
FIG. 4 is a schematic diagram of an image acquisition apparatus according to a fourth embodiment of the present disclosure.

FIG. 4 shows a schematic diagram of an image acquisition apparatus according to a fourth embodiment of the present disclosure, of which the structure is mostly the same as that in the embodiment shown in FIG. 3, except that two adjacent imaging pinholes 2 of the four imaging pinholes 2 on the imaging plate 1 are disposed differently from that in FIG. 3.

In this embodiment, a distance from an object being scanned (a finger) to a midpoint of an axis of the imaging pinhole 2 is an object distance $h_{object}$, that is, a distance from the object being scanned to a midpoint O of an axis A-A of the imaging pinhole 2 is the object distance $h_{object}$, and the object distance $h_{object}$ satisfies a formula of $$h_{object} \geq \frac{\sqrt{2}\, r}{2 tg(\alpha/2)},$$

where r represents a distance between centers of the two adjacent imaging pinholes, and α represents an angular field of view of the imaging pinhole. This ensures that the scanned fingerprint image is complete and no areas are omitted. The scanning region is defined as a visual range on the object (finger) corresponding to the angular field of view of each of the imaging pinholes 4.

Meanwhile, the distance r between the centers of the two adjacent imaging pinholes satisfies a formula of r≥2·$h_{image}$tg(α/2), where $h_{image}$ represents an image distance, which is a distance from the image sensor 3 to the midpoint of the axis of the imaging pinhole 2, and α represents the angular field of view of the imaging pinhole. In this way, it is further ensured that images of the imaging regions corresponding to the respective imaging pinholes 4 are not overlapping with each other, assuring the quality of the image acquisition. The imaging region is defined as a sensing range on the image sensor 3 corresponding to the angular field of view α of each of the imaging pinholes 2, that is, a size of an image spot of each of the imaging pinholes 2.

In this embodiment, assuming that $h_{image}$ is equal to 2 millimeters and α is equal to 120 degrees, then r≥4√3, that is, r is greater than or equal to 6.928 millimeters. The object distance $h_{object}$ is greater than or equal to 2.828 millimeters, so that the imaging is performed through the imaging pinholes 4 separately, and the imaging pinholes 4 are not interfere with each other.

For the derivation of the two above formulas, reference may be made to the following analysis in a fifth embodiment.

Figure 5A:
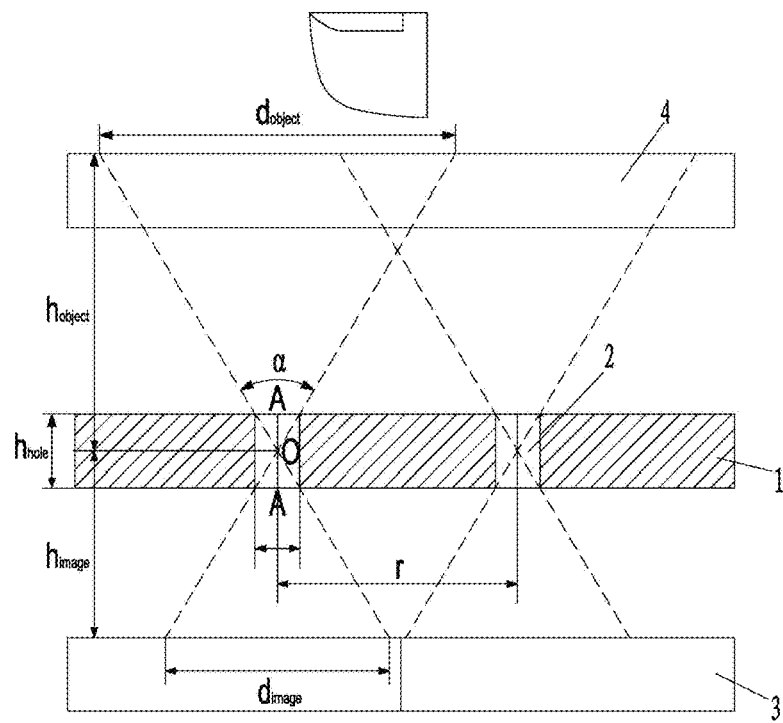
FIG. 5A is a schematic diagram of an image acquisition apparatus according to a fifth embodiment of the present disclosure.

FIG. 5A shows a schematic diagram of an image acquisition apparatus according to a fifth embodiment of the present disclosure, of which the structure is mostly the same as that in the embodiment shown in FIG. 4, except that a transparent protection panel 4 is disposed above and spaced apart from the imaging plate 1 in this embodiment. In this embodiment, since the object being scanned is placed on the protection panel 4 to be detected, the object distance $h_{object}$ is a distance from one side of the protection panel 4 away from the imaging plate 1 to the midpoint of the axis of the imaging pinhole 2.

The above formulas $$h_{object} \geq \frac{\sqrt{2}\,r}{2tg(\alpha/2)}$$

and r≥2·$h_{image}$tg(α/2) are derived as follows.

(1) Assuming that the thickness of the imaging plate 2 is $h_{hole}$, and the aperture of the imaging pinhole 2 is $d_{hole}$;

(2) Referring to FIG. 5A, the imaging angle α may be calculated based on the above-mentioned $h_{hole}$ and $d_{hole}$, that is, tg(α/2)=($d_{hole}$/2)/($h_{hole}$/2), then α=2arctg($d_{hole}$/$h_{hole}$)  (formula 1)

(3) The image distance $h_{image}$ is given, and then the diameter $d_{image}$ of the imaging region may be calculated as, referring to FIG. 5A, $d_{image}$=2·$h_{image}$·tg(α/2)  (formula 2)

(4) As the imaging regions must not overlap, the distance r between the centers of two adjacent imaging pinholes may be calculated as, r≥$d_{image}$, that is, r≥2·$h_{image}$·tg(α/2)  (formula 3)

Figure 5B:
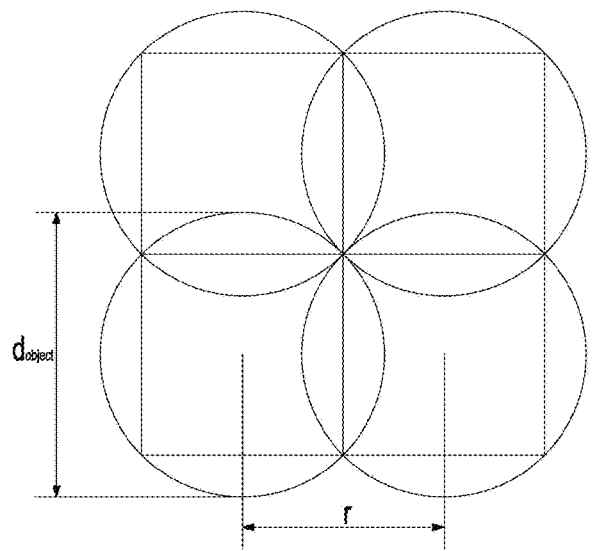
FIG. 5B is a top view of an image scanning region as shown in FIG. 5A.

(5) In conjunction with FIG. 5A and FIG. 5B, to ensure that the fingerprint image is complete and no area is omitted, the image scanning region corresponding to each imaging pinhole (that is, a visual range corresponding to the angular field of view of each imaging pinhole 2 on the protection panel 4, wherein $d_{object}$ represents its diameter in FIG. 5A and FIG. 5B) must overlap, that is, $d_{object}$≥√2r;

and since $d_{object}$=2$h_{object}$·tg(α/2),

2$h_{object}$19 tg(α/2)≥√2r;

which can be simplified to $$h_{object} \geq \frac{\sqrt{2}\,r}{2tg(\alpha/2)} \quad \text{(formula 4)}$$

An image acquisition method for the image acquisition apparatus according to the embodiment includes the following steps.

As the number of the imaging pinholes 2 is four, four scanning regions are established for one fingerprint, so that adjacent scanning regions are overlapping with each other.

Images of partial fingerprints in the respective scanning regions are acquired by using the image sensor 3 through the imaging pinholes 2, so that images of partial fingerprints in adjacent imaging regions do not overlap.

The images of the partial fingerprints in the respective scanning regions through scanning are stitched together, and after further image enhancement processing, a complete fingerprint image is obtained.

The transparent protection panel 4 is used to provide a touch surface for the finger, facilitating the acquisition of the fingerprint image. In addition, this protects the components under the light guide plate 1.

Figure 6:
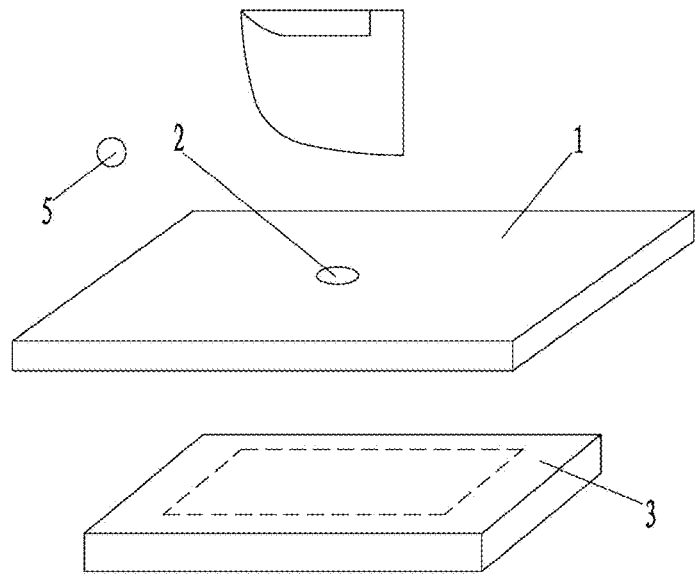
FIG. 6 is a schematic diagram of an image acquisition apparatus according to a sixth embodiment of the present disclosure.

FIG. 6 shows a schematic structural diagram of an image acquisition apparatus according to a sixth embodiment of the present disclosure, of which the structure may be mostly the same as that in the embodiment shown in any one of FIG. 1 to FIG. 5. In this embodiment, the structure thereof is the same as that in FIG. 1. The difference is in that a light emitter 5 is disposed above, below or at a side of the imaging plate 1, preferably, below or at a side end surface of the imaging plate 1. In this embodiment, the light emitter 5 is disposed at the side end surface of the imaging plate 1. Light is emitted to the object being scanned, for example, the fingerprint, through the light emitter 5. Light in various directions is diffused after the fingerprint is irradiated. Part of the light is projected onto the image sensor 3 through the imaging pinhole 2. The light output by the light emitter 5 does not affect a light path for the imaging of the imaging pinhole 2.

In the above-mentioned embodiments shown in FIG.1 to FIG.6, the image processor of the image sensors 3 may be connected to a wired and/or wireless communication module. Such an design may form a visual monitoring network, which is widely applied to visual monitoring in an industrial production line, monitoring and detection in a complex device, three-dimensional measurement and other fields, such as forest theft and fire protection. Furthermore, the image acquisition apparatus may be arranged in a place which is difficult to be monitored by people, for monitoring unexpected situation, disaster and so on in real time, such as a forest, an inside of mine, an inside of underground pipeline and an inside of large remote equipment (such as lunar rover and spacecraft). In addition, the image acquisition apparatus according to this embodiment can be deployed widely due to low cost.

In the above-mentioned embodiments, an aperture of the imaging pinhole may be in a range from 0.001 mm to 1 mm. For the best imaging effects, shorter imaging distance, processing and other considerations, the aperture of the imaging pinhole may be chosen within a range from 0.01 mm to 0.2 mm, but preferably 0.1 mm.

Figure 7:
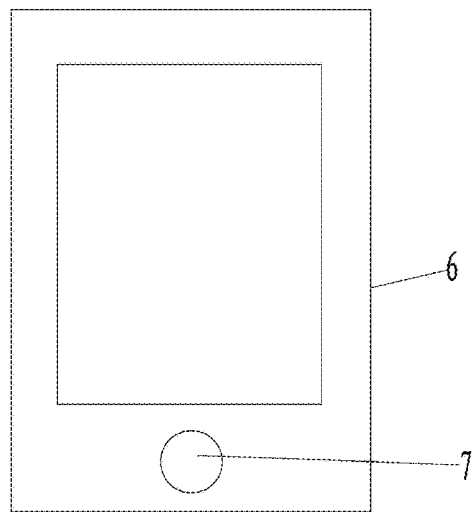
FIG. 7 is a schematic diagram of a terminal device according to a first embodiment of the present disclosure.

Each of the image acquisition apparatuses described above is applicable to various types of terminal devices. In practice, the image acquisition apparatus may be a stand-alone fingerprint scanner. FIG. 7 shows a schematic diagram of a terminal device according to a first embodiment of the present disclosure. A terminal device 6 is provided with the image acquisition apparatus 7 shown in any one of FIG. 1 to FIG. 6 described above. The image acquisition apparatus 7 is disposed at the edge of the terminal device 6. For example, the terminal device may be a mobile phone, and the image acquisition apparatus 7 may be disposed on the HOME key. When compared with a conventional camera component, the image acquisition apparatus has the advantage of a simple structure and ultra-thinness.

Figure 8:
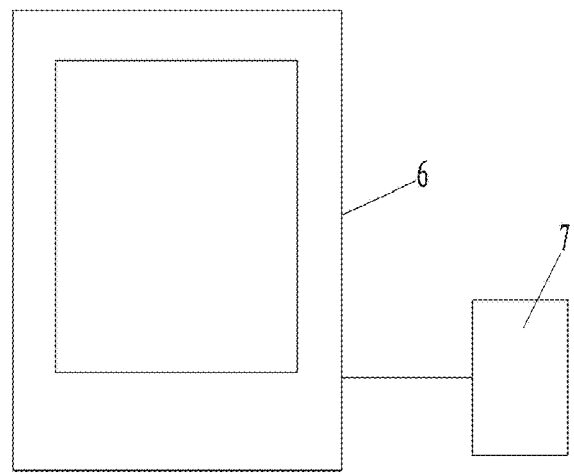
FIG. 8 is a schematic diagram of a terminal device according to a second embodiment of the present disclosure.

FIG. 8 shows a schematic diagram of a terminal device according to a second embodiment of the present disclosure, which includes the image acquisition apparatus 7 shown in any one of FIG. 1 to FIG. 6 described above. The image acquisition apparatus 7 is a stand-alone device, and is connected to the terminal device 6 through a cable and an interface.

In the following, a liquid crystal terminal device according to the disclosure is illustrated in conjunction with embodiments.

Figure 9:
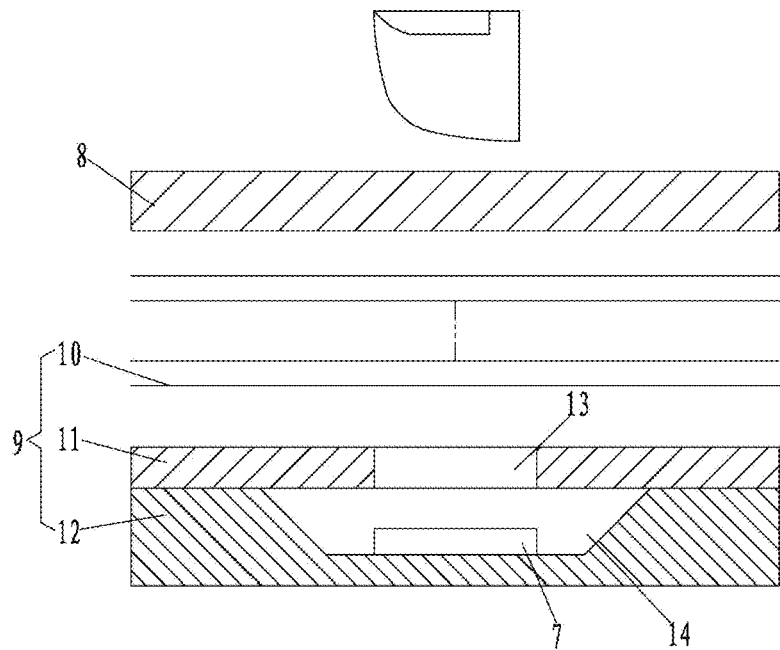
FIG. 9 is a schematic diagram of a liquid crystal terminal device according to a first embodiment of the present disclosure.

FIG. 9 shows a schematic diagram of a terminal device according to a first embodiment of the present disclosure. The terminal device includes a LCD screen. The LCD screen includes a LCD panel 8 and a backlight element 9 disposed below the LCD panel 8. In this embodiment, the LCD panel 8 is a transparent panel body composed of two (upper and lower) glass panels and liquid crystal molecules sandwiched between the two glass panels. From top to bottom, the backlight element 9 includes one or more layers of optical film 10, a reflective sheet 11, and a back plate 12. The image acquisition apparatus according to any of FIG. 1 to FIG. 6 is disposed between the reflective sheet 11 and the back plate 12. In this embodiment, the reflective sheet 11 is closely placed against the back plate 12. A via 13 is disposed at the center of the reflective sheet 11. A concave area 14 is disposed at a position corresponding to the via 13 on an upper surface of the back plate 12. The image acquisition apparatus 7 is fixed within the concave area 14, and a light transmitting window is disposed on the optical film 10 at a position corresponding to the image acquisition apparatus 7.

When the LCD panel 8 is in a transparent state, the object being scanned on or above an upper surface of the LCD panel 8 is acquired by the image acquisition apparatus 7 through the via 13, the light transmitting window on the optical film 10 and the LCD panel 8. In this embodiment, the object being scanned is a fingerprint. furthermore, the object may be a face. The light transmitting window disposed on the optical film 10 prevents the acquisition of images from being affected when the optical film 10 is not easy to transmit light or cannot transmit light. If any optical film 10 is totally light-transmitting, the optical film 10 is a light transmitting window. If any optical film 10 is not easy to transmit light or cannot transmit light, the light transmitting window on the optical film 10 may be a transparent hole or a light transmitting sheet.

This embodiment may be performed through sunlight when the LCD panel 8 is in the transparent state. However, when the light is weak, the light emitter according to the embodiment shown in FIG. 6 may be used.

Figure 10:
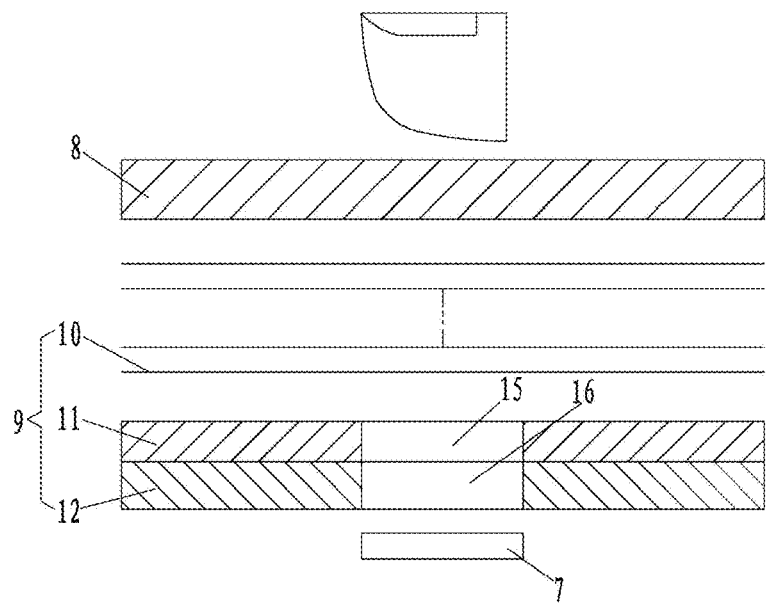
FIG. 10 is a schematic diagram of a liquid crystal terminal device according to a second embodiment of the present disclosure.

FIG. 10 shows a schematic diagram of a liquid crystal terminal device according to a second embodiment of the present disclosure, of which the structure is mostly the same as that in the embodiment shown in FIG. 9. The difference is in that the image acquisition apparatus 7 is disposed below the back plate 12 at a position corresponding to the LCD panel 8; a first via 15 and a second via 16 interlinked are respectively disposed on the reflective sheet 11 and the back plate 12 at positions corresponding to the image acquisition apparatus 7; and the light transmitting window is disposed on each optical film 10 at a position corresponding to the image acquisition apparatus 7. When the LCD panel 8 is in the transparent state, a fingerprint image on the upper surface of the LCD panel 8 is acquired by using the image acquisition apparatus 7 through the second via 16, the first via 15, the light transmitting window on the optical film 10 and the LCD panel 8.

Figure 11:
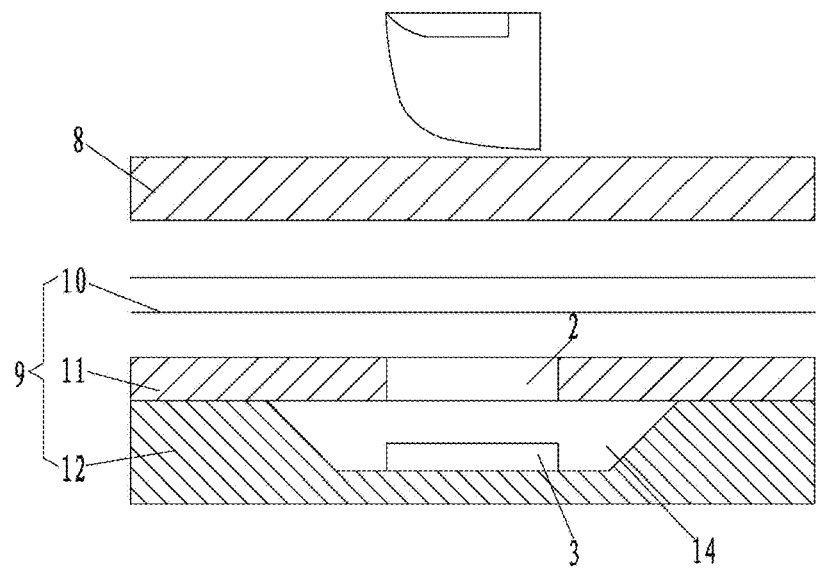
FIG. 11 is a schematic diagram of a liquid crystal terminal device according to a third embodiment of the present disclosure.

FIG. 11 shows a schematic diagram of a liquid crystal terminal device according to a third embodiment of the present disclosure, of which the structure is mostly the same as that in the embodiment shown in FIG. 9. The difference is in that an image sensor 3 is disposed between the reflective sheet 11 and the back plate 12 at a position corresponding to the LCD panel 8, and an imaging pinhole 2 is disposed on the reflective sheet 11 at a position corresponding to the image sensor 3. The imaging pinhole 2 is disposed to be spaced apart from the image sensor 3.

When the fingerprint is acquired, the LCD panel 8 is put into the transparent state in response to a control signal.

The fingerprint image on the LCD panel 8 is acquired by using the image sensor 3 below the LCD panel 8 through the imaging pinhole 2, the light transmitting window on optical film 10 and the LCD panel 8.

Figure 12:
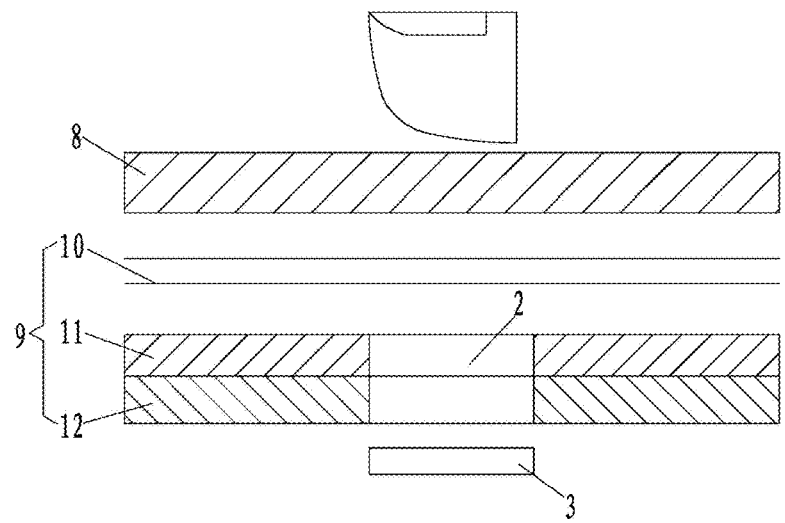
FIG. 12 is a schematic diagram of a liquid crystal terminal device according to a fourth embodiment of the present disclosure.

FIG. 12 shows a schematic diagram of a liquid crystal terminal device according to a fourth embodiment of the present disclosure, of which the structure is mostly the same as that in the embodiment shown in FIG. 10. The difference is in that an image sensor 3 is disposed below the back plate 12 at a position corresponding to the LCD panel 8, and an imaging pinhole 2 is disposed through the reflective sheet 11 and the back plate 12 at a position corresponding to the image sensor 3. In this embodiment, the reflective sheet 11 and the back plate 12 together act as the imaging plate in the image acquisition apparatus according to the embodiment shown in any one of FIG. 1 to FIG. 6. The imaging pinhole 2 is disposed to be spaced apart from the image sensor 3. When the LCD panel 8 is in the transparent state, the fingerprint image on the upper surface of the LCD panel 8 is acquired by using the image sensor 3 through the imaging pinhole 2, the light transmitting window on the optical film 10 and the LCD panel 8.

Figure 13:
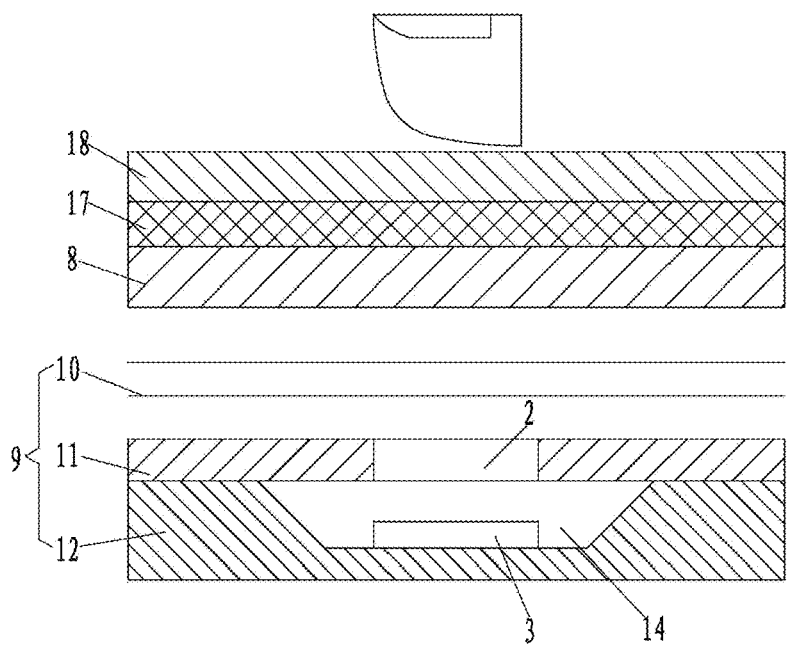
FIG. 13 is a schematic diagram of a liquid crystal terminal device according to a fifth embodiment of the present disclosure.

FIG. 13 shows a schematic diagram of a liquid crystal terminal device according to a fifth embodiment of the present disclosure, of which the structure is mostly the same as that in the embodiment shown in FIG. 11. The difference is in that the liquid crystal terminal device further includes a touch screen 17 and a glass protection layer 18, wherein the touch screen 17 is located below the glass protection layer 18 and above the LCD panel 8.

Figure 14:
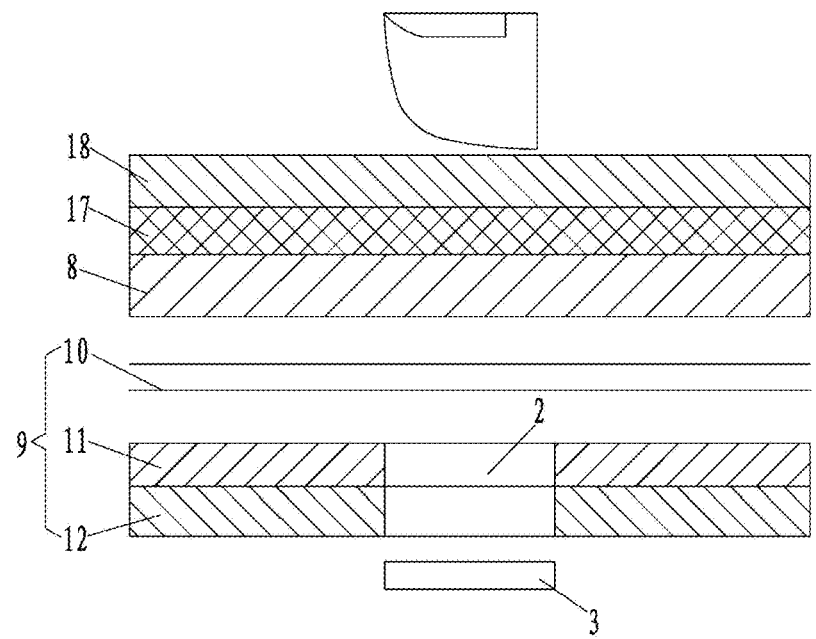
FIG. 14 is a schematic diagram of a liquid crystal terminal device according to a sixth embodiment of the present disclosure.

FIG. 14 shows a schematic diagram of a liquid crystal terminal device according to a sixth embodiment of the present disclosure, of which the structure is mostly the same as that in the embodiment shown in FIG. 12. The difference is that the liquid crystal terminal device further includes a touch screen 17 and a glass protection layer 18, wherein the touch screen 17 is disposed below the glass protection layer 18 and above the LCD panel 8.

In the embodiments shown in both FIG. 13 and FIG. 14 described above, the touch screen 17 and the glass protection layer 18 are disposed on the upper surface of the LCD panel 8. In use, when the finger directly touches an upper surface of the glass protection layer 18, the fingerprint image on the upper surface of the glass protection layer 18 may be acquired by the image sensor 3 when the LCD panel 8 is in the transparent state.

In the embodiments of the liquid crystal terminal devices shown in FIG. 11 to FIG. 14 described above, the aperture of the imaging pinhole 2 is in a range from 0.001 mm to 1 mm. For the best imaging effects, shorter imaging distance, processing and other considerations, the aperture of the imaging pinhole 2 is chosen within a range from 0.01 mm to 0.2 mm, but preferably 0.1 mm.

Figure 15:
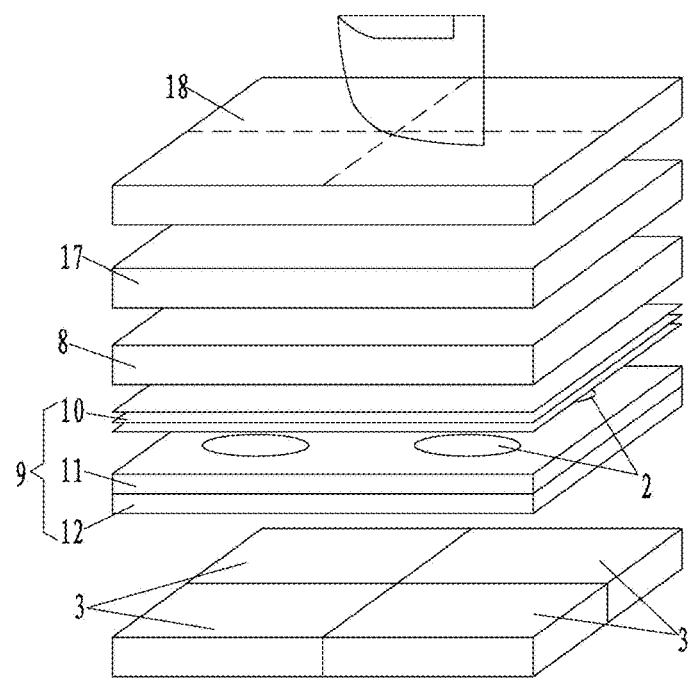
FIG. 15 is a schematic diagram of a liquid crystal terminal device according to a seventh embodiment of the present disclosure.

FIG. 15 shows a schematic diagram of a liquid crystal terminal device according to a seventh embodiment of the present disclosure, of which the structure is mostly the same as that in the embodiment shown in FIG. 14, except that multiple imaging pinholes 2 are disposed through the reflective sheet 11 and the back plate 12. In this embodiment, the number of the imaging pinholes 2 is set to four, and the number of the image sensors 3 is set to four. The image sensors 3 corresponds to the imaging pinholes 2, respectively.

An image acquisition method for the liquid crystal terminal device according to the embodiment includes the following steps.

The LCD panel 8 is put into a transparent state in response to a control signal.

Multiple scanning regions are established for one fingerprint above the glass protection layer 18, wherein the number of the scanning regions is four, and adjacent scanning regions are overlapping with each other.

Figure 16:
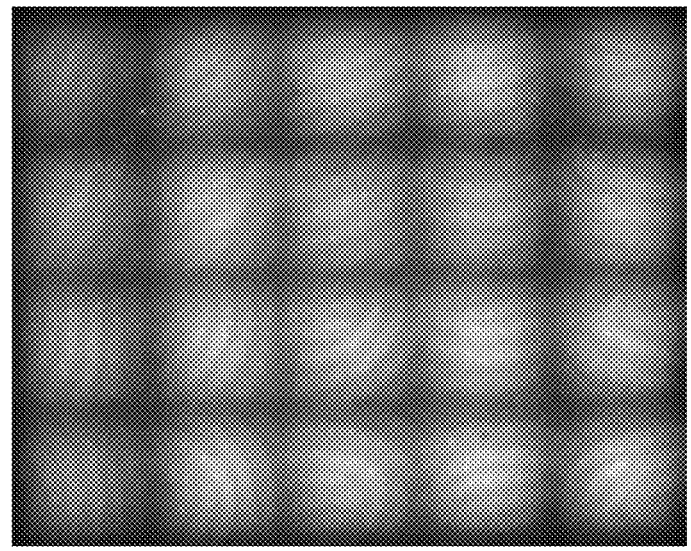
FIG. 16 is a schematic diagram of four fingerprint images acquired by the liquid crystal terminal device shown in FIG. 15.

Images of partial fingerprints in the scanning regions are acquired one by one, wherein images of partial fingerprints in imaging regions do not overlap with each other. The images of partial fingerprints corresponding to the imaging pinholes 2 by controlling the four image sensors 3 below the LCD panel 8 one by one. That is, the images of partial fingerprints in the four scanning regions are acquired by controlling the image sensors 3 to work, respectively. Referring to FIG. 16, 20 images of partial fingerprints are acquired. In use, images of partial fingerprints corresponding to the image sensors 3 are acquired by controlling the image sensors 3 to work one after the other, wherein the images of partial fingerprints in adjacent imaging regions are overlapping with each other.

Figure 17:
FIG. 17 is a complete fingerprint image obtained by stitching together the fingerprint images shown in FIG. 16.

The images of partial fingerprints in each of the imaging regions obtained through scanning are stitched together to obtain a complete fingerprint image. Specifically, the overlapping regions in the four fingerprint images are cut, and then the fingerprint images are stitched together to obtain a complete fingerprint image. For example, the 20 partial fingerprint images in FIG. 16 are stitched together to the complete fingerprint image in FIG. 17.

The control signal described above may be a control signal obtained by the touch screen 17, a control signal obtained by touching a key, a control signal obtained in response to a remote signal, or the similar.

In the embodiments of the liquid crystal terminal devices shown in FIG. 9 to FIG. 15 described above, the fingerprint is the object being scanned, but generally the object may be any other planar or three-dimensional object.

Figure 18:
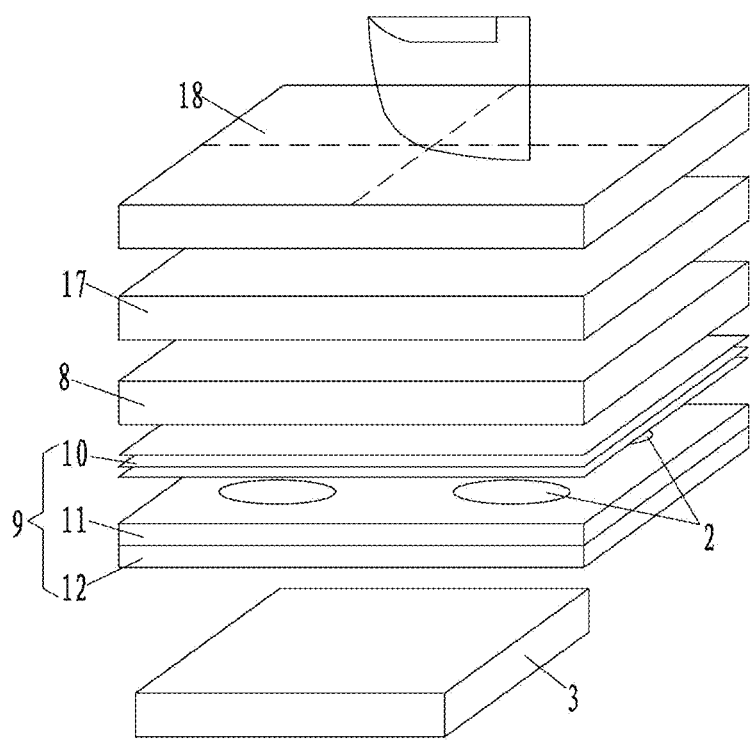
FIG. 18 is a schematic diagram of a liquid crystal terminal device according to an eighth embodiment of the present disclosure.

FIG. 18 shows a schematic diagram of a liquid crystal terminal device according to an eleventh embodiment of the present disclosure, of which the structure is mostly the same as that in the embodiment shown in FIG. 15, except that the number of the image sensor 3 is set to one.

An image acquisition method for the liquid crystal terminal device includes the following steps.

The LCD panel 8 is put into a transparent state in response to a control signal.

Multiple scanning regions are established for one fingerprint on the glass protection layer 18, wherein the number of the scanning regions is four, and adjacent scanning regions are overlapping with each other.

The LCD panel 8 is divided into four LCD regions, corresponding to the scanning regions, respectively. In response to a control signal, the respective LCD regions are put into a transparent state one by one by controlling the four respective LCD regions to work, for example, one after another, such that the image sensors 3 can acquire the partial fingerprint images in the corresponding scanning regions through the imaging pinholes 2 and the corresponding liquid crystal regions. Thus, partial fingerprint images in the LCD regions can be acquired in turn. Here, partial fingerprint images in the respective imaging regions do not overlap with each other.

Four images of partial fingerprints in the imaging regions are stitched together to obtain a complete fingerprint image.

In the embodiments of the liquid crystal terminal devices shown in FIG. 9-FIG. 15 and FIG. 18 described above, an optical filter may be disposed between the imaging pinhole 2 and the image sensor 3 or between the imaging pinhole 2 and the LCD panel 8 to control the uniformity of the light. In addition, a correction lens may be disposed on either side or both sides of the imaging pinhole 2 to adjust the light, to obtain a clear image even if the imaging pinhole has a large aperture.

The foregoing description is only the preferred embodiments of the present disclosure and is not intended to define the scope of protection of the present disclosure. Any variations or substitutions which can readily envisaged by those skilled in the art without departing from the spirit of the invention shall fall into the scope of the invention. The protection scope of the invention should be defined in the appended claim.

What is claimed is:

1. An image acquisition apparatus comprising:
    an imaging plate and one or more image sensors disposed to be spaced apart from one side of the imaging plate, wherein the imaging plate is provided with at least one imaging pinhole corresponding to the image sensors, and light through the imaging pinholes is imaged by the image sensors,
    wherein a distance from an object being scanned to a center plane of the imaging plate is an object distance $h_{object}$, and the object distance $h_{object}$ satisfies a formula of $$h_{object} \geq \frac{\sqrt{2}\, r}{2 tg(\alpha/2)},$$

wherein r represents a distance between centers of two adjacent imaging pinholes, and $\alpha$ represents an angular field of view of the imaging pinholes.

2. A terminal device, comprising: a display screen, wherein the display screen comprises a display panel and a backlight element, wherein the backlight element comprises a reflective sheet, a back plate and at least one layer of optical film disposed between the display panel and the reflective sheet, and the image acquisition apparatus according to claim 1 is disposed between the reflective sheet and the back plate, or below the back plate; and the field of view of the image acquisition apparatus between an object being scanned and the image acquisition apparatus is not blocked for imaging.

3. An image acquisition apparatus comprising:
an imaging plate and one or more image sensors disposed to be spaced apart from one side of the imaging plate, wherein the imaging plate is provided with at least one imaging pinhole corresponding to the image sensors, and light through the imaging pinholes is imaged by the image sensors,
wherein a distance r between centers of two adjacent imaging pinholes satisfies a formula of $r \geq 2 \cdot h_{image} tg(\alpha/2)$, wherein $h_{image}$ represents an image distance, which is a distance from the image sensor to a center plane of the imaging plate, and $\alpha$ represents an angular field of view of the imaging pinholes.

4. A terminal device, comprising:
a display screen, wherein the display screen comprises a display panel and a backlight element, wherein the backlight element comprises a reflective sheet, a back plate and at least one layer of optical film disposed between the display panel and the reflective sheet, and the image acquisition apparatus according to claim 3 is disposed between the reflective sheet and the back plate, or below the back plate; and the field of view of the image acquisition apparatus between an object being scanned and the image acquisition apparatus is not blocked for imaging.

5. An image acquisition method for the terminal device according to claim 4, comprising:
putting a display panel into a transparent state in response to a control signal; and
establishing multiple scanning regions for one object being scanned, wherein adjacent scanning regions are overlapping with each other; and
capturing partial images of the object being scanned in the scanning regions by the image sensor through the imaging pinholes, wherein partial images in adjacent imaging regions do not overlap with each other; and
stitching together the partial images in all imaging regions to obtain a complete image of the object being scanned.

6. A terminal device, comprising a display screen, wherein the display screen comprises a display panel and a backlight element, wherein the backlight element comprises a reflective sheet, a back plate and at least one layer of optical film disposed between the display panel and the reflective sheet,
wherein an image sensor is disposed between the reflective sheet and the back plate, and one or more imaging pinholes are disposed on the reflective sheet at a position corresponding to the image sensor, the reflective sheet being also used as an imaging plate; or
the image sensor is disposed below the back plate, and one or more imaging pinholes are disposed through the reflective sheet and the back plate at a position corresponding to the image sensor, the reflective sheet and the back plate being also used as an imaging plate,
wherein the field of view of the image sensor between an object being scanned and the image sensor is not blocked for imaging,
wherein a distance from the object being scanned to a center plane of the imaging plate is an object distance $h_{object}$, and the object distance $h_{object}$ satisfies a formula of $$h_{object} \geq \frac{\sqrt{2}\, r}{2 tg(\alpha/2)},$$

wherein r represents a distance between centers of two adjacent imaging pinholes, and $\alpha$ represents an angular field of view of the imaging pinholes.

7. An image acquisition method for an image acquisition apparatus comprising an imaging plate and one or more image sensors disposed to be spaced apart from one side of the imaging plate, wherein the imaging plate is provided with at least one imaging pinhole corresponding to the image sensors, and light through the imaging pinholes is imaged by the image sensors, the method comprising:
establishing multiple scanning regions for one object being scanned, wherein adjacent scanning regions are overlapping with each other;
capturing partial images of the object being scanned in the scanning regions by the image sensor through the imaging pinholes, wherein partial images in adjacent imaging regions do not overlap with each other; and
stitching together the partial images in all imaging regions to obtain a complete image of the object being scanned.

8. An image acquisition method for the terminal device according to any one of claims 2-3, comprising:
putting a display panel into a transparent state in response to a control signal; and
establishing multiple scanning regions for one object being scanned, wherein adjacent scanning regions are overlapping with each other; and
capturing partial images of the object being scanned in the scanning regions by the image sensor through the imaging pinholes, wherein partial images in adjacent imaging regions do not overlap with each other; and
stitching together the partial images in all imaging regions to obtain a complete image of the object being scanned.

* * * * *